United States Patent
Becker et al.

(10) Patent No.: US 6,658,452 B1
(45) Date of Patent: Dec. 2, 2003

(54) SCHEMES FOR SELECTING AND PASSING AN APPLICATION FROM AN APPLICATION PROVIDER TO AN APPLICATION SERVICE PROVIDER

(75) Inventors: Craig Henry Becker, Austin, TX (US); William W. Lawton, Georgetown, TX (US); Stewart Earle Nickolas, Austin, TX (US); Wayne Elmo Vicknair, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/458,645

(22) Filed: Dec. 9, 1999

(51) Int. Cl.[7] ............................................. G06F 15/16
(52) U.S. Cl. ...................................................... 709/201
(58) Field of Search ................................ 709/229, 201, 709/203, 227, 228; 717/174, 175; 725/122, 109, 110

(56) References Cited

U.S. PATENT DOCUMENTS

| | | | | |
|---|---|---|---|---|
| 5,790,792 A | * | 8/1998 | Dudgeon et al. | 709/212 |
| 5,838,916 A | * | 11/1998 | Domenikos et al. | 345/753 |
| 5,961,586 A | * | 10/1999 | Pedersen | 709/201 |
| 6,138,148 A | * | 10/2000 | Lipkin | 705/40 |
| 6,289,362 B1 | * | 9/2001 | Van Der Meer | 715/501.1 |
| 6,289,363 B1 | * | 9/2001 | Consolatti et al. | 715/515 |
| 6,295,639 B1 | * | 9/2001 | Van Der Meer | 717/103 |
| 6,370,552 B1 | * | 4/2002 | Bloomfield | 345/759 |
| 6,405,224 B1 | * | 6/2002 | Van Der Meer | 715/513 |
| 6,405,367 B1 | * | 6/2002 | Bryant et al. | 717/115 |
| 6,415,316 B1 | * | 7/2002 | Van Der Meer | 709/203 |
| 6,457,076 B1 | * | 9/2002 | Cheng et al. | 710/36 |
| 6,487,663 B1 | * | 11/2002 | Jaisimha et al. | 713/193 |
| 6,510,466 B1 | * | 1/2003 | Cox et al. | 709/229 |
| 2002/0010783 A1 | * | 1/2002 | Primak et al. | 709/228 |
| 2002/0078203 A1 | * | 6/2002 | Greschler et al. | 709/225 |
| 2002/0115407 A1 | * | 8/2002 | Thompson et al. | 455/3.01 |
| 2002/0174241 A1 | * | 11/2002 | Beged-Dov et al. | 709/230 |
| 2002/0174422 A1 | * | 11/2002 | Kelley et al. | 717/178 |

* cited by examiner

*Primary Examiner*—Dung C. Dinh
*Assistant Examiner*—Kimberly Flynn
(74) *Attorney, Agent, or Firm*—Duke W. Yee; Volel Emile; Patrick C. R. Holmes

(57) ABSTRACT

A method and apparatus for use in a distributed data processing system for transferring an application. A user selection of an application at a first site is detected. Responsive to detecting the user selection of the application, location information for the application is passed to a second site. The application is transferred from the first site to the second site using the location information.

26 Claims, 4 Drawing Sheets

SCHEMES FOR SELECTING AND PASSING AN APPLICATION FROM AN APPLICATION PROVIDER TO AN APPLICATION SERVICE PROVIDER

BACKGROUND OF THE INVENTION

1. Technical Field

The present invention relates generally to an improved data processing system and in particular to an improved method and apparatus for providing applications to users. Still more particularly, the present invention provides a method and apparatus for providing users access to application over a distributed data processing system.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web".Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page",is identified by a URL. The URL provides a universal, consistent method for finding and accessing this information, not necessarily for the user, but mostly for the user's Web "browser".A browser is a program capable of submitting a request for information identified by a URL at the client machine. Retrieval of information on the Web is generally accomplished with an HTML-compatible browser. The Internet also is widely used to transfer applications to users using browsers. With respect to commerce on the Web, individual consumers and businesses use the Web to purchase various goods and services. In offering goods and services, some companies offer goods and services solely on the Web while others use the Web to extend their reach.

Users exploring the Web have discovered that the content supported by HTML document format on the Web was too limited. Users desire an ability to access applications and programs, but applications were targeted towards specific types of platforms. As a result, not everyone could access applications or programs. This deficiency has been minimized though the introduction and use of programs known as "applets",which may be embedded as objects in HTML documents on the Web. Applets are Java programs that may be transparently downloaded into a browser supporting Java along with HTML pages in which they appear. These Java programs are network and platform independent. Applets run the same way regardless of where they originate or what data processing system onto which they are loaded.

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software and extends the capabilities of a Web browser because programmers can write an applet once, and the applet can be run on any Java enabled machine on the Web.

With Java applications and other more application specific applications, application service providers are providing users access to applications that are maintained and managed by the applications service providers. An applications service provider typically provides a suite of Web based software applications that a user may access.

These applications are located and maintained at the application service provider rather than at a client machine. A user may access applications by contacting the application service provider. This contact is facilitated through the use of Web pages. The applications selected and used by the user may take many forms. For example, an application may take the form of an applet that is sent to the client when the user selects the application for execution. Alternatively, an application may reside at the application service provider with processes being executed at the application service provider's server. The user interacts with the application through a graphical user interface, which may be for example, a Web page or an applet that functions to receive input and present response to the user input.

Under the "open hosting" application service provider model, a user must "shop around" or "browse" various application providers on the Internet for the desired applications. These application providers are third party vendors of software. The user is required to select applications from these application providers and arrange for their transfer to the application service provider, thus building a custom-"suite" of applications that is hosted by the application service provider. The process of selection and transfer may differ from one application provider to another application provider. The process of setting up a suite of applications at an application service provider can be time consuming and tedious.

Therefore it would be desirable to have an improved method and apparatus for selecting and installing applications on an application service provider.

SUMMARY OF THE INVENTION

The present invention provides a method and apparatus for use in a distributed data processing system for transferring an application. A user selection of an application at a first site is detected. Responsive to detecting the user selection of the application, location information for the application is passed to a second site. The application is transferred from the first site to the second site using the location information.

This process is particularly useful for use in selecting applications from a application provider to use in at application service provider. The location information provided may take the form of a universal resource identifier or some other key that the application service provider may use to obtain the application.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
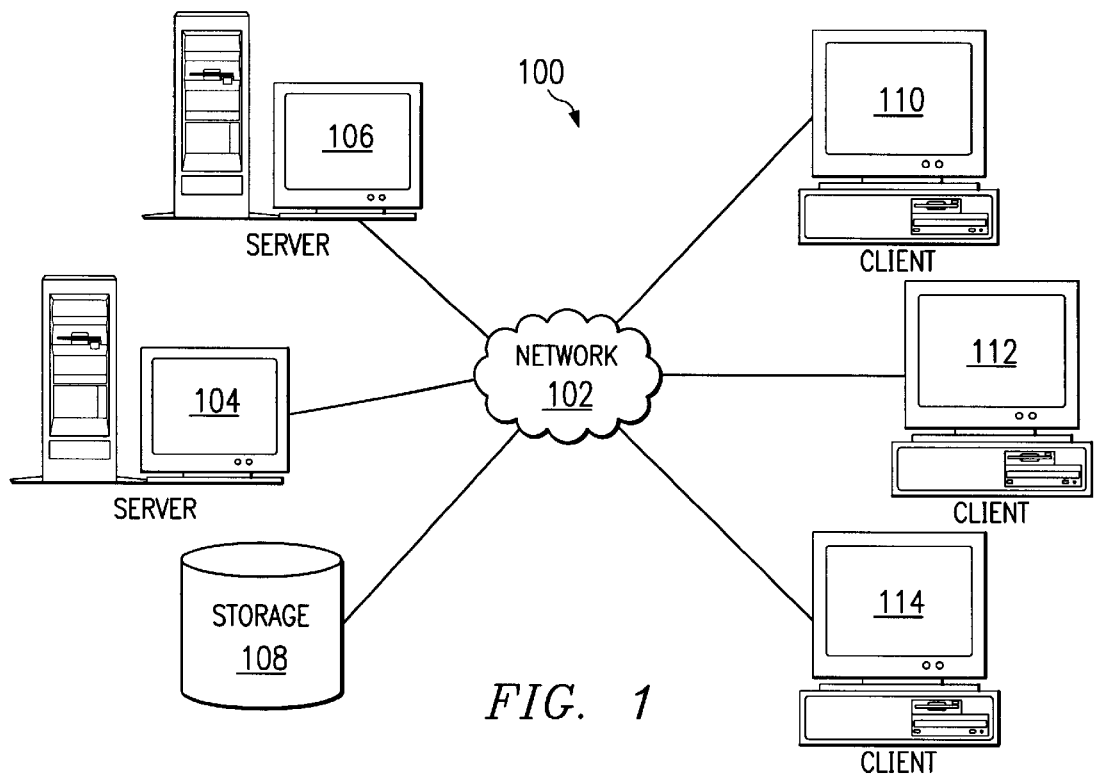
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 and a server 106 is connected to network 102 along with storage unit 108. In addition, clients 110, 112, and 114 also are connected to network 102. These clients 110, 112, and 114 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 110, 112, and 114 are clients to server 104. In this example, server 104 may be an application service provider from which users at clients 110–114 access suites of applications. Server 106 in this example may be an application provider from which users at clients 110–114 select applications for use on server 104.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
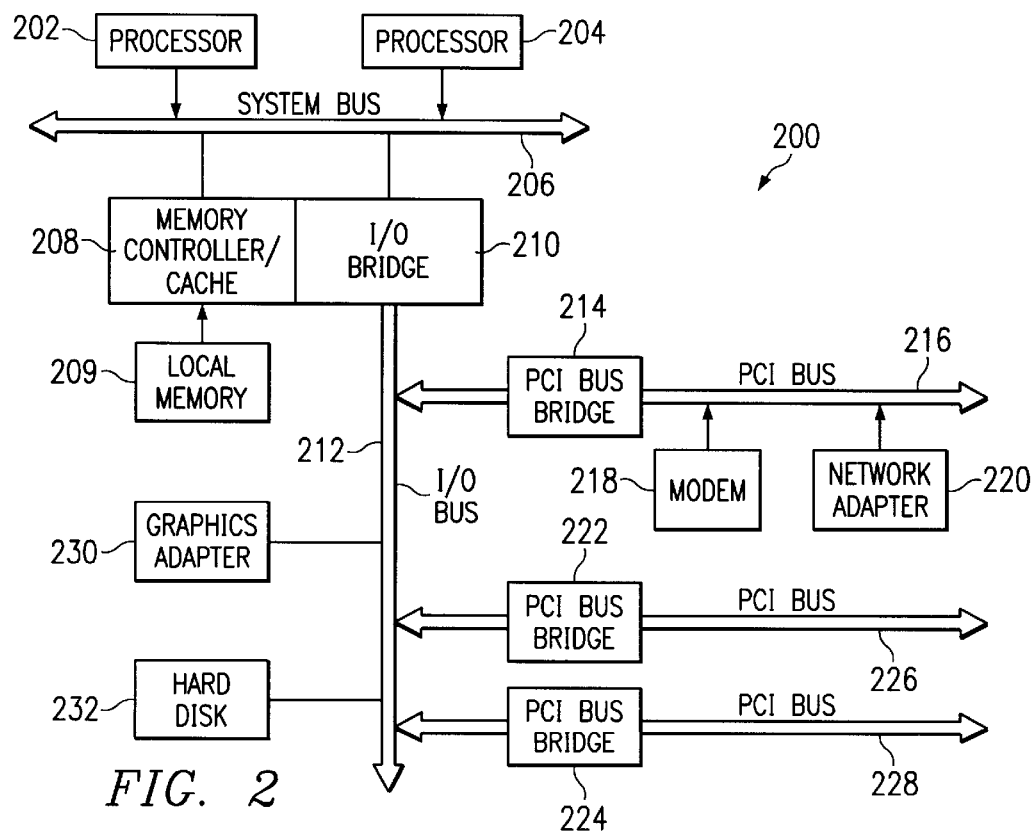
FIG. 2 is a block diagram depicting a data processing system that may be implemented as a server, such as server 104 in FIG. 1, in accordance with a preferred embodiment of the present invention.

Referring to FIG. 2, a block diagram depicting a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to .PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

The present invention provides a method, apparatus, and computer implemented instructions for selecting a file containing an application and passing that file to an application service provider (ASP) for subsequent installation. The present invention provides a mechanism for applications to be selected by a user at an application provider (AP) and for that application to be passed to the ASP. In particular, a universal resource indicator (URI) to the application is passed from the AP to the ASP. In these examples, the URI is. a universal resource locator (URL).

Figure 3:
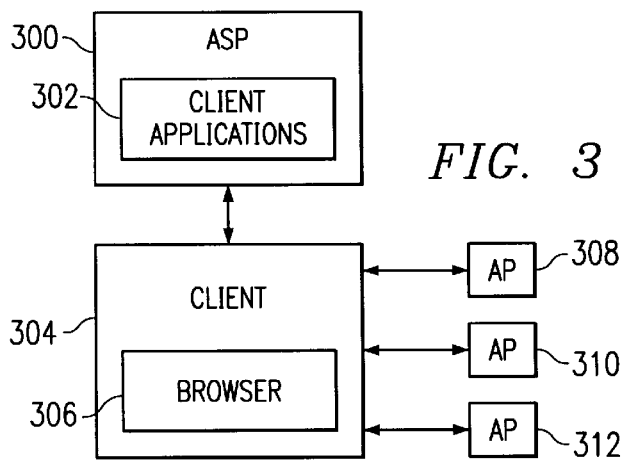
FIG. 3 is a diagram illustrating components used to pass applications selected by a user to an application service provider (ASP) in accordance with a preferred embodiment of the present invention.

With reference now to FIG. 3, a diagram illustrating components used to pass applications selected by a user to an application service provider (ASP) is depicted in accordance with a preferred embodiment of the present invention. In this example, ASP 300 contains client applications 302, which may be accessed by client 304 using browser 306. Client applications 302 are maintained at ASP 300. These applications may take various forms, such as Java applets. Of course, other applications may be used, especially Web based applications. Client applications 302 are selected by the user at client 304. These applications may be selected by the user at client 304 visiting Web sites for application providers, such as APs 308, 310, and 312.

Figure 4:
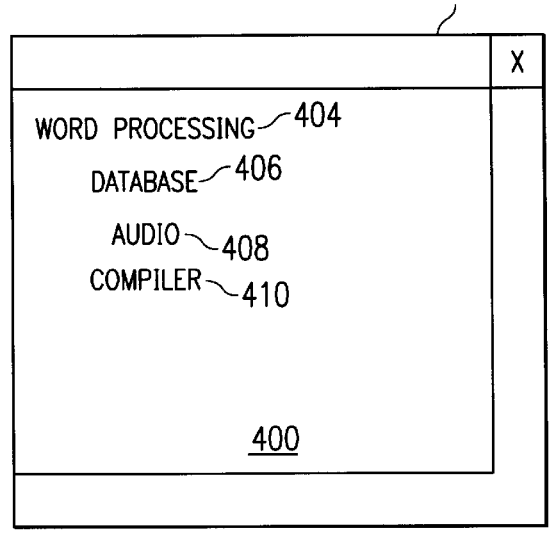
FIG. 4 is a diagram illustrating a Web page from an ASP used to select applications in accordance with a preferred embodiment of the present invention.

In these examples, a user begins shopping for applications at ASP 300, which may provide a list of application providers. With reference now to FIG. 4, a diagram illustrating a Web page from an ASP used to select applications is depicted in accordance with a preferred embodiment of the present invention. In this example, Web page 400 is displayed in a browser window 402. Web page 400 contains the following links: word processing link 404, database link 406, audio link 408, and compiler link 410. These links are links to application providers. Selection of a link generates a request for a Web page from the application provider.

Figure 5:
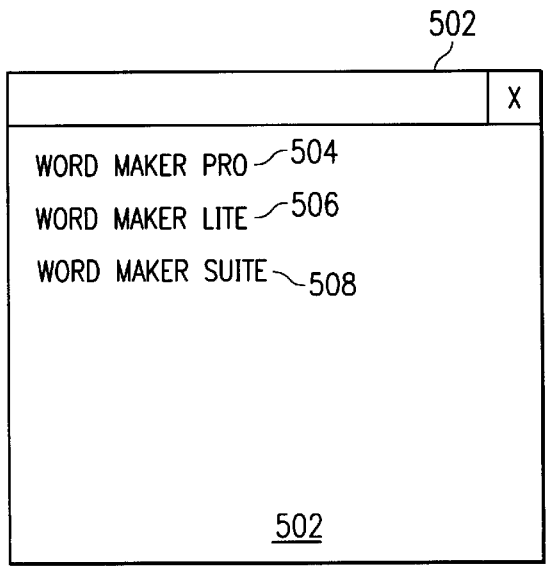
FIG. 5 is a diagram of an AP Web page in accordance with a preferred embodiment of the present invention.

Turning now to FIG. 5, a diagram of an AP Web page is depicted in accordance with a preferred embodiment of the present invention. In this example, Web page 500 is displayed in browser window 502. Web page 500 is retrieved in response to a user selection of word processing link 404. In response to a selection of word processing link 404, a HTTP request is generated and sent to the AP to retrieve Web page 500. In response to this request, a HTTP referer header in the request from the user for this Web page is read to identify the ASP. This information is stored as session information.

The following links are displayed in Web page 500: Word Maker Pro 504, Word Maker Lite 506, and Word Maker Suite 508. The user may select one of these links to select an application for use at the ASP. These links are dynamically generated links that refer back to the ASP using the referer information obtained from the header of the request. For instance, the dynamically generated link might look like this:

"http://www.aspco.com/
   doAddApplication?wordmakerpro.jar".

Figure 6:
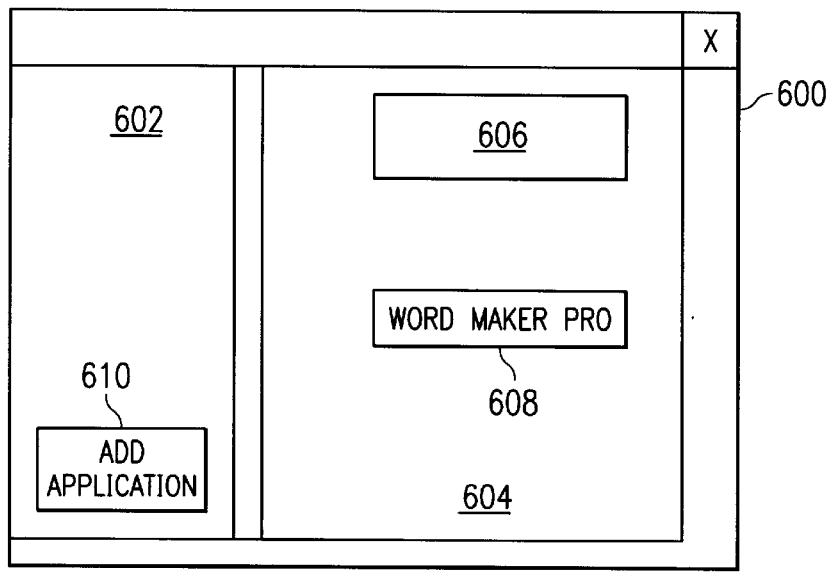
FIG. 6 is a diagram illustrating a framed Web page used to select an application in accordance with a preferred embodiment of the present invention.

With reference now to FIG. 6, a diagram illustrating a framed Web page used to select an application is depicted in accordance with a preferred embodiment of the present invention. In this example, browser window 600 provides a framed Web page including a minor frame 602 for the ASP and a major frame 604 for the AP. Region 606 in this example is located in major frame 604 and contains information about the application. Section 608 is an "eye catcher" section contained in major frame 604 and is used to identify the application. For example, the eye catcher may be as follows: <APPLICATION>http://www.goodapps.com/webcalendar.jar</APP LICATION>. In this example, only one eye catcher is present in a page. This eye catcher may or may not be visible in major frame 604. In this example, the text "Word Maker Pro" is present to indicate the presence of the eye catcher.

When a user chooses the application currently present in major frame 604, add application button 610 is selected. In response, a process is initiated in minor frame 602 to identify the eye catcher located in section 608 of major frame 604. The information contained in the eye catcher is extracted and used by the processes at the ASP to obtain the file containing the application. In these examples, JavaScript is used to scan for the eye catcher. In this example, no dynamic content is required and the information may be implemented in a single static page.

Figure 7:
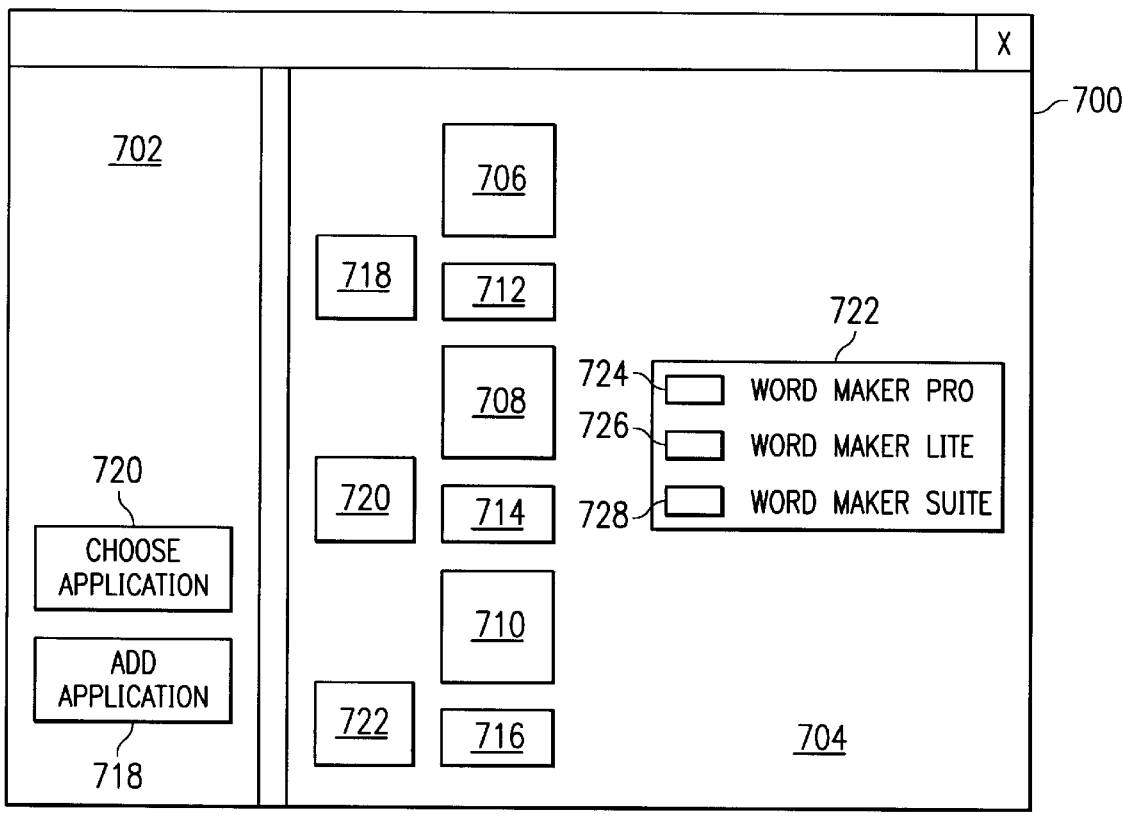
FIG. 7 is a diagram illustrating a framed Web page used to select applications in accordance with a preferred embodiment of the present invention.

With reference now to FIG. 7, a diagram illustrating a framed Web page used to select applications is depicted in accordance with a preferred embodiment of the present invention. In this example, multiple eye catchers are present in the framed Web page. Browser window 700 includes a minor frame 702 and a major frame 704 in which regions 706, 708, and 710 contain information about applications. Regions 712, 714, and 716 contain eye catchers for applications described in regions 706, 708, and 710. Controls 718, 720, and 722 are presented to allow a user to select applications that are to be added to the user's suite of applications. These controls may take various forms, such as check boxes or buttons. In response to a user selecting add application button 718, the processes in minor frame 702 will search the Web page located in major frame 704 for eye catchers selected by the user. The selected eye catchers will be used to request the applications from the AP.

Alternatively, a "choose application" button 720 may be selected by the user. A selection of this button causes a pop up window 722 to be displayed in which a list of applications contained on the page in major frame 704 are presented. From this list, applications may be selected using controls 724, 726, and 728. When add application button 718 is selected, eye catchers or other identification information is obtained for the selected applications. This mechanism also requires no dynamic content and may be implemented in a single static page.

Figure 8:
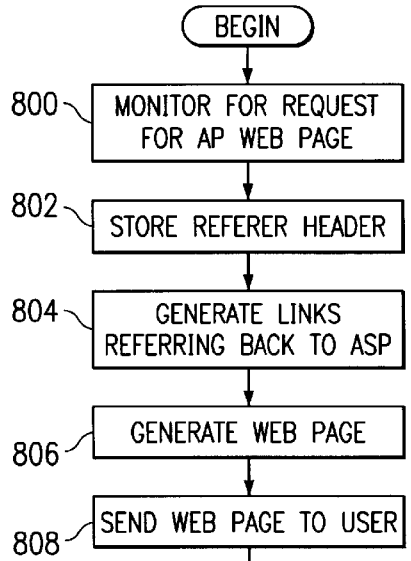
FIG. 8 is a flowchart of a process for transferring a URL used to access an application in accordance with a preferred embodiment of the present invention.

With reference now to FIG. 8, a flowchart of a process for transferring a URL used to access an application is depicted in accordance with a preferred embodiment of the present invention. The process begins by monitoring for a request for a Web page from the AP (step 800). Upon detecting the request, referer information is identified from the HTTP header and stored as session information (step 802). This information is used to generate links referring back to the ASP (step 804). A Web page containing application information and the dynamically generated links is generated (step 806). The Web page is then sent to the user (step 808) with the process terminating thereafter.

Figure 9:
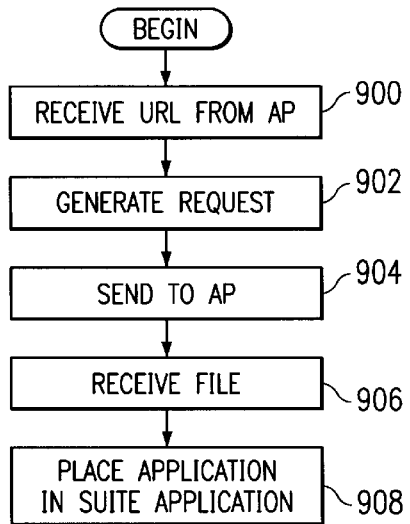
FIG. 9 is a flowchart of a process for obtaining an application in accordance with a preferred embodiment of the present invention.

With reference now to FIG. 9, a flowchart of a process for obtaining an application is depicted in accordance with a preferred embodiment of the present invention. The process begins by receiving a URL from an AP (step 900). A request is generated for the file containing the application (step 902). The request is then sent to the AP (step 904) and the file is received from the AP (step 906). The application in the file is placed into a suite of applications for the user (step 908) with the process terminating thereafter.

Figure 10:
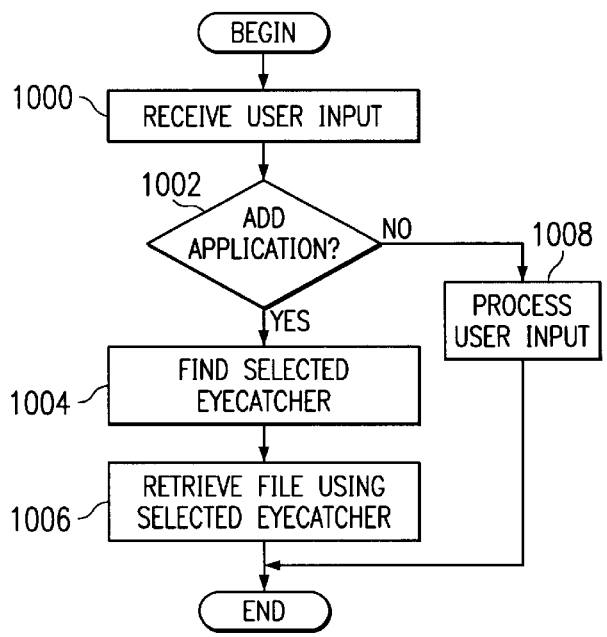
FIG. 10 is a flowchart of a process for selecting applications using a framed Web page in accordance with a preferred embodiment of the present invention.

With reference now to FIG. 10, a flowchart of a process for selecting applications using a framed Web page is depicted in accordance with a preferred embodiment of the present invention. The process illustrated in FIG. 10 may be used to process user input into a framed Web page for an ASP and an AP. The process begins by receiving user input (step 1000). A determination is then made as to whether the user input is to add an application (step 1002). If the user input is to add an application, a selected eye catcher is identified (step 1004). This identification may be performed in a number of different ways. For example, if the page only contains a single application, a single eye catcher is identified. If multiple eye catchers are present, these eye catchers are identified in step 1004. Multiple eye catchers may be selected in step 1002 through a user input to controls, such as check boxes or buttons. One or more files are retrieved using the selected eye catcher or eye catchers (step 1006) with the process terminating thereafter.

With reference again to step 1002, if the user input is not to add an application, the user input is processed (step 1008) with the process terminating thereafter.

Figure 11:
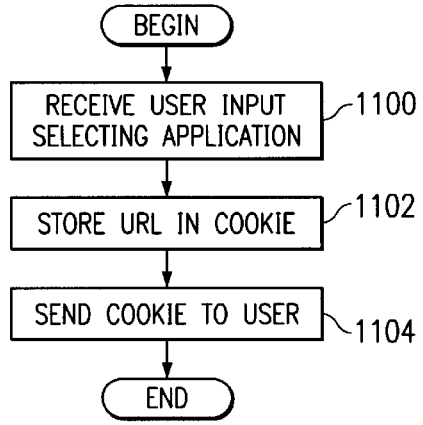
FIG. 11 is a flowchart of a process for selecting applications in accordance with a preferred embodiment of the present invention.

Turning next to FIG. 11, a flowchart of a process for selecting applications is depicted in accordance with a preferred embodiment of the present invention. This process is implemented at an AP and used to generate information to retrieve or transfer applications to an ASP. The process begins by receiving user input selecting an application (step 1100). A URL to the application is stored in a cookie (step 1102). The cookie is then sent to the user (step 1104) with the process terminating thereafter.

Figure 12:
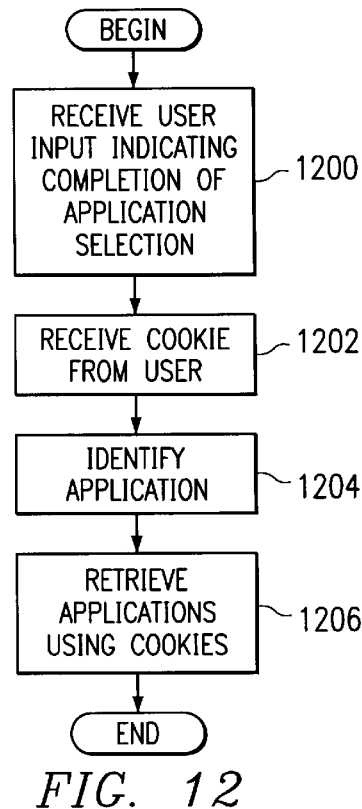
FIG. 12 is a flowchart of a process used to obtain an application using a cookie in accordance with a preferred. embodiment of the present invention.

In FIG. 12, a flowchart of a process used to obtain an application using a cookie is depicted in accordance with a preferred embodiment of the present invention. This process is implemented at an ASP to identify applications for retrieval for placement in a suite of applications for a user. The cookie is stored in the user's browser and contains the URL to an 'application acceptor program' for example "http://www.aspco.com/doAddApplication.cgi". When a page containing an "add application" link is to be presented, the AP reads the cookie and uses this information to dynamically construct a URL such as http://www.aspco.com/doAddApplication.cgi?appname=WordMak er". The process begins by receiving user input indicating completion of application selection (step 1200). In response to receiving this input, the cookie is retrieved from the user (step 1202). The applications to be added are identified (step 1204). The application is then retrieved using the information in the cookie (step 1206) with the process terminating thereafter. Although this process illustrates retrieval of a single application, the process may be applied to multiple cookies retrieved from different APs. Additionally, a single cookie may be used to add multiple applications to an ASP.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method in a distributed data processing system for transferring an application, the method comprising the data processing system implemented steps of:

detecting a client selection of an application at a first server;

responsive to detecting the client selection of the application, passing location information for the application to a second server; and transferring the application from the first server to the second server using the location information.

2. The method of claim 1, wherein the location information is a uniform resource identifier.

3. The method of claim 2, wherein the uniform resource identifier is a uniform resource locator to a file of the application.

4. The method of claim 1, wherein the application is an applet.

5. The method of claim 1, wherein the first server is an application provider.

6. The method of claim 1, wherein the second server is an application service provider.

7. The method of claim 1 further comprising:

displaying a link used to select the application in a Web page.

8. The method of claim 1 further comprising:

displaying a Web page for the first server in a major frame, wherein the Web page includes the location information for the application;

providing a selection mechanism in a minor frame for the second server; and responsive to the client selection of the application using the selection mechanism, identifying the location information.

9. The method of claim 8, wherein the Web page includes information for additional applications and location information for the additional application and wherein the client selection also includes selecting the location information for the application.

10. The method of claim 9, wherein a plurality of check boxes are associated with the application and the additional applications and wherein the location information for the application is selected by selecting a check box within the plurality of check boxes associated with the application.

11. The method of claim 1, wherein the step of passing the location information includes:

placing the location in a cookie; and sending the cookie to the client.

12. The method of claim 1, wherein the step of transferring the application comprises:

responsive to an indication that the application is to be transferred, obtaining a cookie from the client; and sending a request from the second server to the first server for a transfer of the application using the location information in the cookie.

13. A distributed data processing system for transferring an application, the distributed data processing system comprising:

detecting means for detecting a user selection of an application at a first site from a third site;

passing means, responsive to detecting the user selection of the application, for passing location information for the application to a second site; and transferring means for transferring the application from the first site to the second site using the location information.

14. The distributed data processing system of claim 13, wherein the location information is a uniform resource identifier.

15. The distributed data processing system of claim 14, wherein the uniform resource identifier is a uniform resource locator to a file of the application.

16. The distributed data processing system of claim 13, wherein the application is an applet.

17. The distributed data processing system of claim 13, wherein the first site is an application provider.

18. The distributed data processing system of claim 13, wherein the second site is an application service provider.

19. The distributed data processing system of claim 13 further comprising:

displaying means for displaying a link used to select the application in a Web page.

20. The distributed data processing system of claim 13 further comprising:

displaying means for displaying a Web page for the first site in a major frame, wherein the Web page includes the location information for the application;

providing means for providing a selection mechanism in a minor frame for the second site; and identifying means, responsive to the user selection of the application using the selection mechanism, for identifying the location information.

21. The distributed data processing system of claim 20, wherein the Web page includes information for additional applications and location information for the additional application and wherein the user selection also includes selecting the location information for the application.

22. The distributed data processing system of claim 21, wherein a plurality of check boxes are associated with the application and the additional applications and wherein the location information for the application is selected by selecting a check box within the plurality of check boxes associated with the application.

23. The distributed data processing system of claim 13, wherein the step of passing the location information includes:

placing means for placing the location in a cookie; and sending means for sending the cookie to the user.

24. The distributed data processing system of claim 13, wherein the step of transferring the application comprises:

obtaining means, responsive to an indication that the application is to be transferred, for obtaining the cookie from the user; and sending means for sending a request from the second site to the first site for a transfer of the application using the location information in the cookie.

25. A computer program product in a computer readable medium for transferring an application in a distributed data processing system, the computer program product comprising:

first instructions for detecting a user selection of an application at a first site; and second instructions, responsive to detecting the user selection of the application, for passing location information for the application to a second site; and third instructions for transferring the application from the first site to the second site using the location information.

26. A computer program product in a computer readable medium for transferring an application, the computer program product comprising:

first instructions for detecting a user selection of an application at a first site; and second instructions, responsive to detecting the user selection of the application, for passing location information for the application to a second site; and third instructions for transferring the application from the first site to the second site using the location information.

* * * * *